United States Patent
Shaffer et al.

[11] Patent Number: 6,050,690
[45] Date of Patent: Apr. 18, 2000

[54] APPARATUS AND METHOD FOR FOCUSING A PROJECTED IMAGE

[75] Inventors: Shmuel Shaffer, Palo Alto; William Joseph Beyda, Cupertino, both of Calif.

[73] Assignee: Siemens Information and Communication Networks, Inc., Boca Raton, Fla.

[21] Appl. No.: 09/004,697

[22] Filed: Jan. 8, 1998

[51] Int. Cl.⁷ .............. G03B 21/26; G03B 21/53
[52] U.S. Cl. .............. 353/122; 353/42; 353/121
[58] Field of Search ................ 353/42, 101, 122; 345/180, 181, 182, 183

[56] References Cited

U.S. PATENT DOCUMENTS

| | | | |
|---|---|---|---|
| 3,861,794 | 1/1975 | Sobotta | 353/101 |
| 3,885,096 | 5/1975 | Inuiya | 178/15 |
| 4,198,138 | 4/1980 | Parker et al. | 353/71 |
| 4,280,135 | 7/1981 | Schlossberg | 358/93 |
| 4,494,839 | 1/1985 | Brueckner | 353/101 |
| 4,808,980 | 2/1989 | Drumm | 340/707 |
| 5,115,230 | 5/1992 | Smoot | 340/707 |
| 5,181,015 | 1/1993 | Marshall et al. | 340/706 |
| 5,235,363 | 8/1993 | Vogeley et al. | 353/42 |
| 5,398,096 | 3/1995 | Yagoto | 355/55 |
| 5,422,693 | 6/1995 | Vogeley et al. | 353/42 |
| 5,455,411 | 10/1995 | Beuter | 250/201.6 |
| 5,502,459 | 3/1996 | Marshall et al. | 345/158 |
| 5,515,079 | 5/1996 | Hauck | 345/157 |
| 5,738,429 | 4/1998 | Tagawa et al. | 353/42 |

*Primary Examiner*—William C. Dowling

[57] ABSTRACT

An apparatus and method controlling a projected image (24) is provided. The apparatus (10) includes a detector (16) that tracks a visual pointer (22) appearing on a projection screen (20). The visual pointer (22) is positioned on the image (24) by a viewer. The visual pointer (22) can be generated by a computer cursor, or a light pen or laser pointer (12). The detector (16) generates a position signal indicating the location of the pointer (22). An auto-focus device (18) focuses the portion of the image (24) referenced by the visual pointer (22) as a function of the position signal. To focus the image portion, the auto-focus device (18) positions a projector lens (26) based on the measured image contrast within the selected image portion.

21 Claims, 11 Drawing Sheets

APPARATUS AND METHOD FOR FOCUSING A PROJECTED IMAGE

BACKGROUND OF THE INVENTION

1. Field of the Invention

The present invention relates generally to image projection systems, and in particular, to an image projection system that permits a remote user or viewer to focus at least a portion of a projected image.

2. Description of the Related Art

Display systems for projecting images onto screens and other suitable surfaces for viewing by large audiences are known. Devices used to project images onto screens include document cameras, overhead projectors, slide projectors, and video cameras. The projected images can be generated by computer programs or by light passing through film slides.

A desirable feature of a display system is to enable a member of the audience to enter information interactively into the system to during the presentation. The prior art provides an arrangement whereby a user directs a high-intensity light from a device, such as a light pen or a laser pointer, onto a projected image to provide control information to the system. Such a system is described in U.S. Pat. No. 5,515,079. In this system, a sensor detects a spot of light cast onto a projected image by a hand-held laser pointer. The position of the spot relative to the image is determined. In turn, this position information is used as a control input. By pulsing the laser beam, the light spot can emulate a computer mouse click. In this manner, the laser pointer can be used to control the display. For example, an audience member with a laser pointer can vary the presentation sequence of a slide show.

The prior art also provides projection systems that include a computer for generating images used in conjunction with a liquid crystal display (LCD). The LCD is placed on the stage of an overhead projector. The projector shines light through the LCD to produce the projected image. In addition to projecting the image, the system can also project anything that appears on the computer monitor, including a computer cursor. Consequently, a user sitting at the computer can move the cursor across the image and control the display using a keyboard or mouse.

U.S. Pat. No. 5,115,230 discloses a projection system that is integrated into a teleconferencing system. This arrangement allows a projected image to be displayed at remote locations using computer display terminals or other projection systems.

A limitation of the above-mentioned projection systems is that they typically provide an average focus capability, where the center of the screen is in clear focus, while the outer edges of the projected image are less focused due to the differences in projection distance. Known automatic focusing devices usually produce a single focal point at the center of the image. Generally, to focus on different portions of an image, a user must manually adjust the projector focus. This can be inconvenient when presenting a slide show before a large audience.

It is desirable to have an image display system that allows a user or member of the audience to automatically focus a selected portion of the displayed image without manual intervention. It is also desirable to include a selective auto-focusing capability in a display system that also permits a remote viewer to input control information using either a computer cursor or a light generating device, such as a laser pointer.

SUMMARY OF THE INVENTION

It is an advantage to the present invention to overcome the auto-focusing limitations of the prior art projection systems. It is also an advantage of the present invention to provide an apparatus and method for displaying an image that allows a viewer to automatically focus a portion of the displayed image.

These and other advantages of the present invention are realized by providing a novel method and apparatus for controlling the display of an image projected onto a surface.

According to one aspect of the present invention, the apparatus includes a detector generating a position signal representative of the location of a visual pointer, appearing on a projected image. The visual pointer can be generated by a viewer using a light generating device shining a spot on the projected image, or by a cursor using a computer input interface, such as a mouse or keyboard. An auto-focus device coupled to the detector can focus the portion of the image referenced by the visual pointer or cursor.

According to another aspect of the invention, the apparatus can respond to a visual pointer input from viewer located in a viewing audience seated before the viewing screen.

BRIEF DESCRIPTION OF THE DRAWINGS

The invention is pointed out with particularity in the appended claims. However, other features of the invention will become more apparent and the invention will be best understood by referring to the following Detailed Description in conjunction with the accompanying drawings in which:

DETAILED DESCRIPTION OF THE INVENTION

Figure 1:
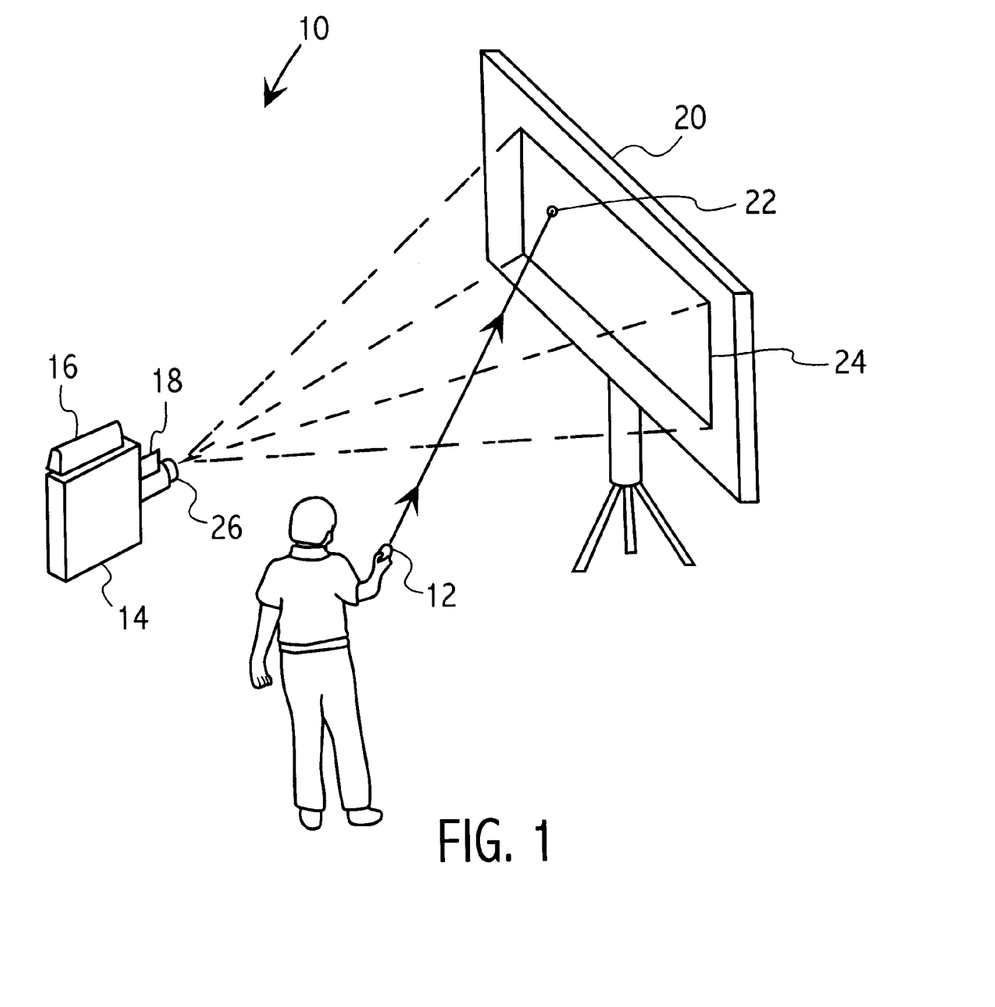
FIG. 1 is a perspective view of an image display system in accordance with a first embodiment of the present invention.

Referring now to the drawings, and more particularly to FIG. 1, there is illustrated a display system 10 that permits a remote user to control the display of a projected image with a light pen or laser pointer 12. A light pen is any device that casts a beam of light without using a laser. The display system 10 includes a projector 14, a detector 16 and an auto-focus device 18. To control the displayed image, a user directs an intense light beam at a screen 20. The light beam impinges on the screen 20 creating a visual pointer 22 that references a portion of the projected image 24. The detector 16 generates an electrical signal in response to the intense light representing the visual pointer 22 against the image 24. The electrical signal can represent the X-Y position information of the visual pointer 22 on the projected image 24. In response to the electrical signal, the auto-focus device 18 adjusts the projector lens 26 to focus the portion of the image 24 indicated by the visual pointer 22.

The projector 14 can be any means for projecting an image onto a surface, such as a conventional overhead projector, a document camera, a video projector, such as a large screen TV, or a slide projector. In addition, the projector 14 and auto-focus device 18 can be integrated into single unit.

Figure 2:
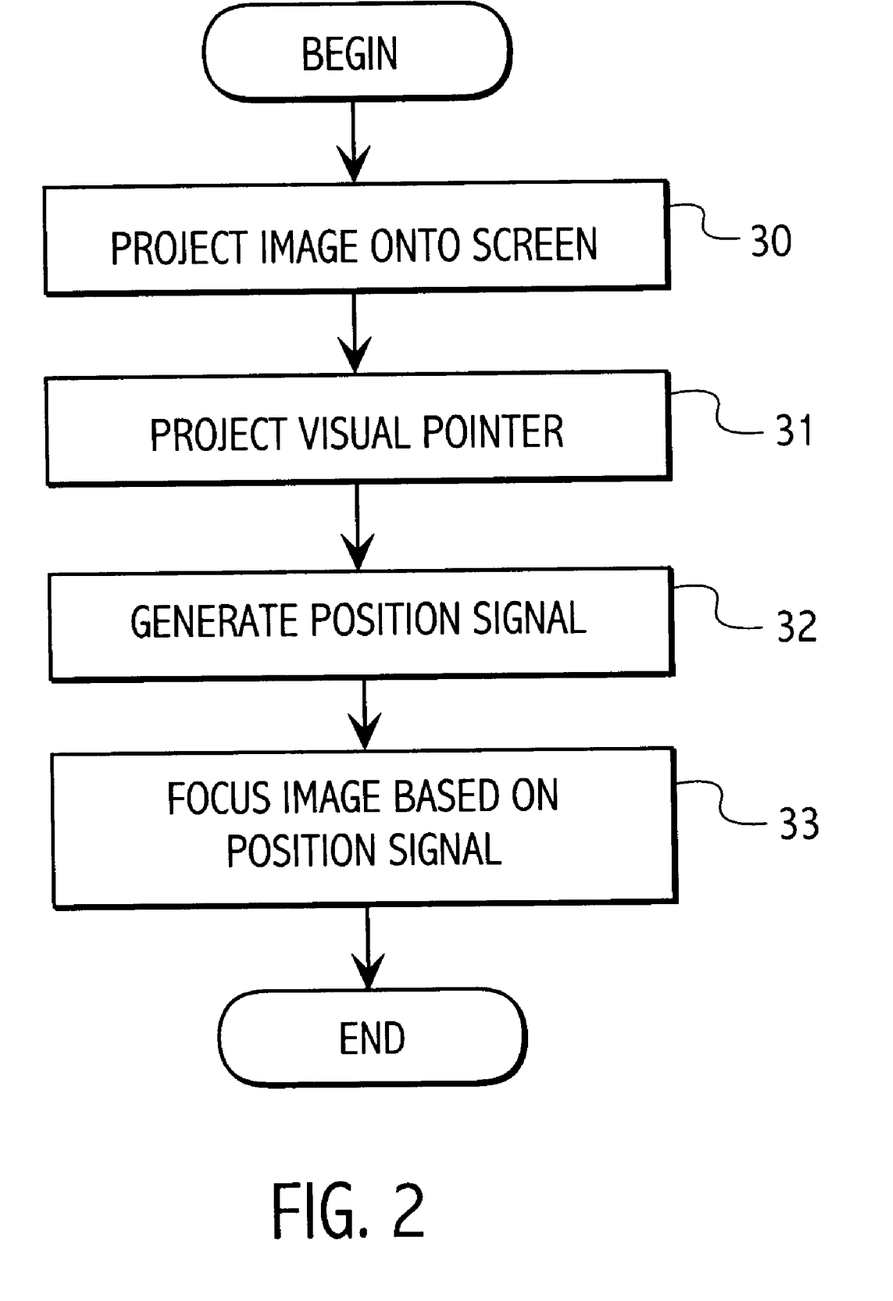
FIG. 2 illustrates a flow diagram of a method of using the display system of FIG. 1.

Referring now to FIG. 2, there is presented a flow diagram of a method of using the display system 10 to focus a projected image. In step 30, an image is displayed onto a surface, such as a screen. The image can be displayed using any means, including but not limited to a video camera, an overhead projector, a document camera or a computer-generated imaged. Next, in step 31, a visual pointer is projected onto the surface to reference a portion of the image. The visual pointer can be generated by a hand-operated light generating device, such as a light pen or a laser pointer, or it can be generated by a computer as a mouse pointer or cursor. In step 32, a position signal that represents the location of the visual pointer on the screen is generated by the detector 16. The position signal can be used to control the displayed image. In addition to being used to focus the image (step 9), the visual pointer can also emulate a mouse click, as described later in this specification. By emulating a mouse click, the pointer can be used to control an interactive computer program for generating the displayed image.

Figure 3:
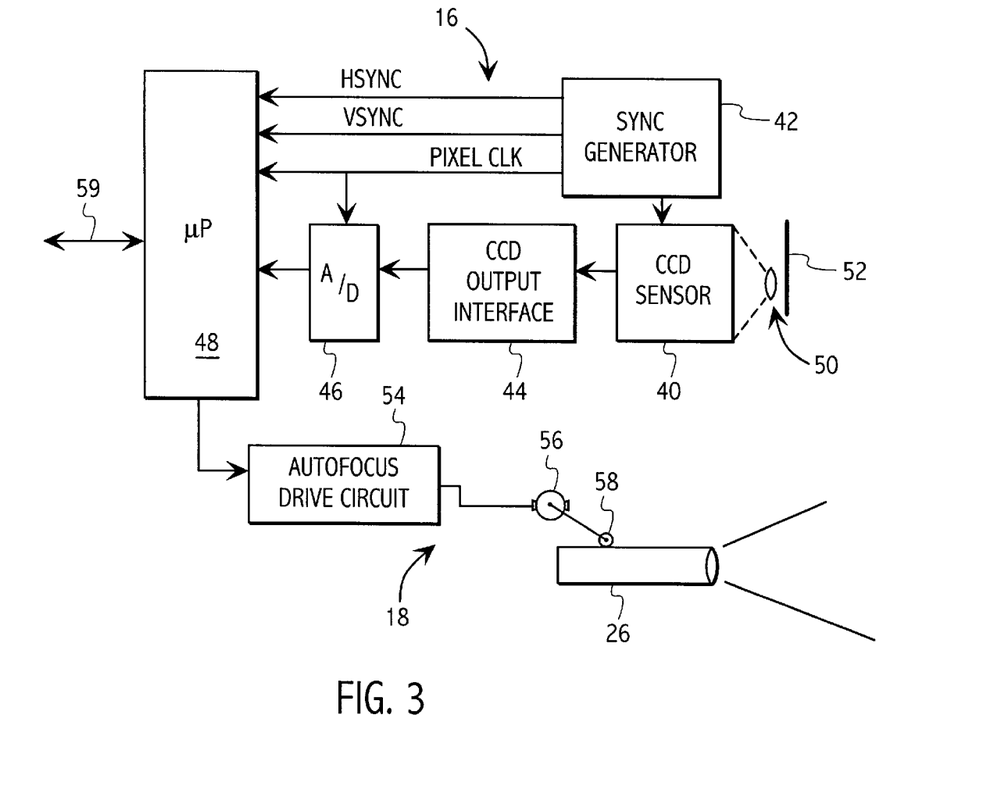
FIG. 3 is a detailed block diagram depicting the detector and autofocus device shown in FIG. 1.

Referring now to FIG. 3, there is illustrated a detailed block diagram of the detector 16 and the auto-focus device 18 of FIG. 1. The detector 16 includes a charge coupled device (CCD) sensor 40, a sync generator 42, a CCD output interface 44, an analog-to-digital (A/D) converter 46, and a microprocessor 48. Reflected light from the display 20 is focused onto the CCD sensor 40 by a lens 50 such as an objective lens. A narrow band optical filter 52 can be placed in front of the CCD sensor 40 to protect against extraneous light reflected by the screen 20. The filter is chosen to pass light with a high level of transmissivity at the wavelength of the light generating device 12 and to reject light at all other wavelengths. When the light generating device 12 is pointed at the surface of the projection screen 20, an intense spot of light is available to the CCD sensor 40 due to the reflection of the light from the projection screen 20.

In one embodiment of the present invention, the CCD sensor 40 responds to infrared radiation. The filter 52 and the CCD sensor 40 are arranged to detect a narrow band of infrared radiation. In conjunction with this arrangement, the light generating device 12 includes both a visible light source and a colinearly projected infrared laser source. Using this system, the visible light from the projector or any other visible ambient light source is completely ignored by the infrared CCD sensor. Only the optical spot created by the infrared light beam impinging on the screen is detected by the detector 16.

The CCD sensor 40 includes a raster array of sensors, with each sensor forming one pixel. Those pixels corresponding to the location of the visual pointer 22 are sensitized while the remainder of the pixels remain unsensitized. The CCD sensor can be implemented using standard components, such as an LC9943 from Sanyo Corporation.

The sync generator 42 provides timing and synchronization signals to the CCD sensor 40, A/D converter 46, and microprocessor 48. The signals include signals that are typically found in video cameras using CCD sensors, such as a vertical retrace synchronizing signal (VSYNC), a horizontal retrace synchronizing signal (HSYNC), and a pixel clock signal. The sync generator can include standard components to implement its functions, such as part no. LC9904 from Sanyo.

Typically, horizontal rows of elements in the CCD array are scanned to generate a pixel signal for each CCD element in the row. The horizontal sync signal indicates the duration of time it takes to scan one row of pixel elements. The vertical synchronizing signal indicates the amount of time required to scan the entire array of pixel elements. The pixel clock signal makes a transition once per scanned pixel element in the CCD sensor 40, and is utilized to develop an output signal indicative of a given pixel location in a horizontal row.

The CCD output interface 44 is provided to interface the CCD sensor 40 to a microprocessor 48 by way of an A/D converter 46. The CCD output interface 44 includes an amplifier for amplifying the video signal produced by the CCD sensor 40. The AND converter 46 converts the amplified video signal to a digital format, such as a grey scale, which indicates the intensity level of the various pixels in the CCD sensor 46. Each pixel intensity is stored along with a pixel clock signal and vertical and horizontal sync signals readable by the microprocessor 48.

The microprocessor 48 is coupled to a communications bus 59 that allows the transfer of data between the detector 16 and a host computer. One of ordinary skill in the art will appreciate that the bus 59 can be implemented using any one of a variety of standard busses, such as an RS-232 serial bus or a PCI parallel bus.

The microprocessor 48 executes two algorithms to automatically focus the portion of the image referenced by the visual pointer 22. The first algorithm (tracking algorithm) determines the X, Y coordinate location of the visual pointer 22 on the image 24. The second algorithm (focusing algorithm) determines whether the image is focused in the location indicated by the visual pointer 22. The focusing algorithm begins execution upon completion of the tracking algorithm.

The tracking algorithm essentially scans the CCD sensor array 40 to find one or more pixels which exceed a predetermined light intensity level. These pixels indicate the location of the visual pointer 22. The location of the illuminated pixels are determined based on the pixel clock signal and the VSYNC and HSYNC signals.

Figure 4:
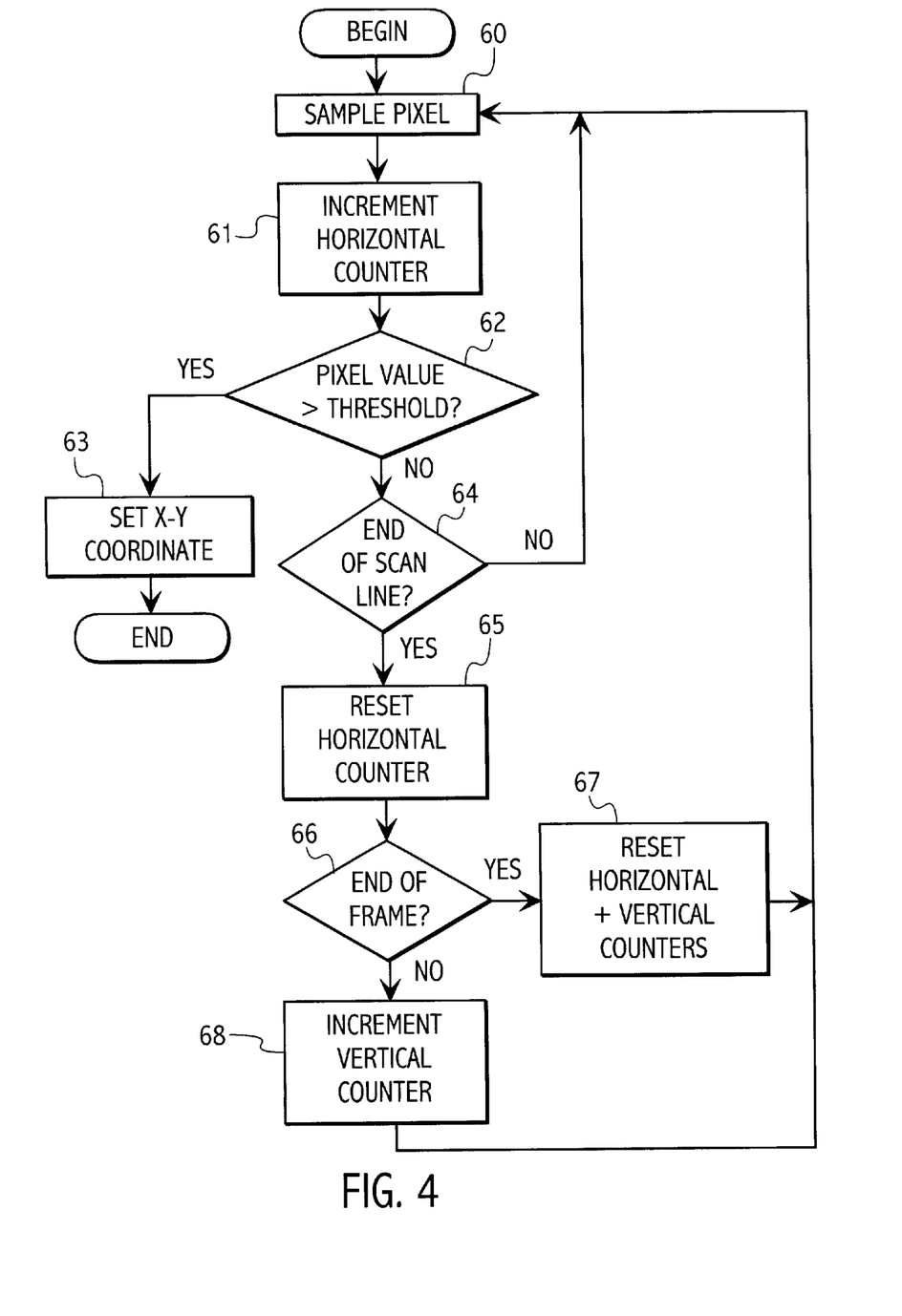
FIG. 4. illustrates a flow diagram of a method of locating a visual pointer that is cast onto a projection surface.

FIG. 4. shows a flow diagram detailing an exemplary tracking algorithm that can be executed by the microprocessor 48. In step 60, a pixel value representing the pixel intensity is sampled from the CCD sensor 40 and can be stored in a register of the microprocessor 48. The first pixel sampled is located at a predetermined starting point of a frame. A frame represents one complete scan of all pixel elements of the CCD sensor 40.

In step 61, a horizontal counter is incremented. The horizonal counter can be a register in the microprocessor 48 and it is typically incremented according to the pixel clock. Essentially, the value in the horizontal counter indicates the X-coordinate of the pixel location, which is the position of the pixel on a horizontal scan line of the CCD sensor 40. On power up or reset, the counter is set to a predetermined value.

In decision step 62, the pixel value is compared to a predetermined threshold value. A pixel value exceeding the threshold indicates that the visual pointer has been located and the algorithm proceeds to step 63, otherwise, the algorithm continues to step 64.

In step 63, the x-y coordinate location of the visual pointer is set to the location of the current pixel. The x-coordinate is set to the value in the horizontal counter, while the y-coordinate is set to the value in the vertical counter. The value in the vertical counter indicates the vertical location of the scan line containing the current pixel. Like the horizontal counter, the vertical counter can be a register in the microprocessor 48 that is resettable to a predetermined value.

In decision step 64, a check is made to determine whether the end on a horizontal scan line has been reached. This check is made by checking the HSYNC signal. If the end of the scan line has been reached, the horizontal counter is reset (step 65). Otherwise, the algorithm returns to step 60.

In decision step 66, the VSYNC signal is checked to determine whether the end of the frame has been reached. If so, the counters are reset (step 67) and the algorithm returns to step 60. If not, the vertical counter is incremented (step 68) before the algorithm returns to step 60.

After determining the X, Y location of the visual pointer, the array of CCD sensors 40 is scanned again. The pixel values in a predetermined proximity of the identified pointer location are stored in memory by the microprocessor 48. These pixel values represent the intensity level of the light impinging on the screen at the selected location. These stored pixel values are then used by the auto-focus algorithm to adjust the position of the projection lens 26.

When a projected image is focused, the difference between the light portions and dark portions of the image, i.e., its contrast, is at its greatest. Conversely, when the contrast of the projected image area detected by the CCD pixels is slight, that is, when the film image area lacks distinct edges, this typically indicates that the portion of the image is not in focus. To measure the contrast, the algorithm can select a single row of pixels in the selected portion and compare their signal intensities with one another to determine an edge, which is indicated by a sufficient difference in intensities. If a selected scan line does not include an edge, the algorithm selects another row of pixels and repeats the comparison until a satisfactory edge is found.

Figure 5:
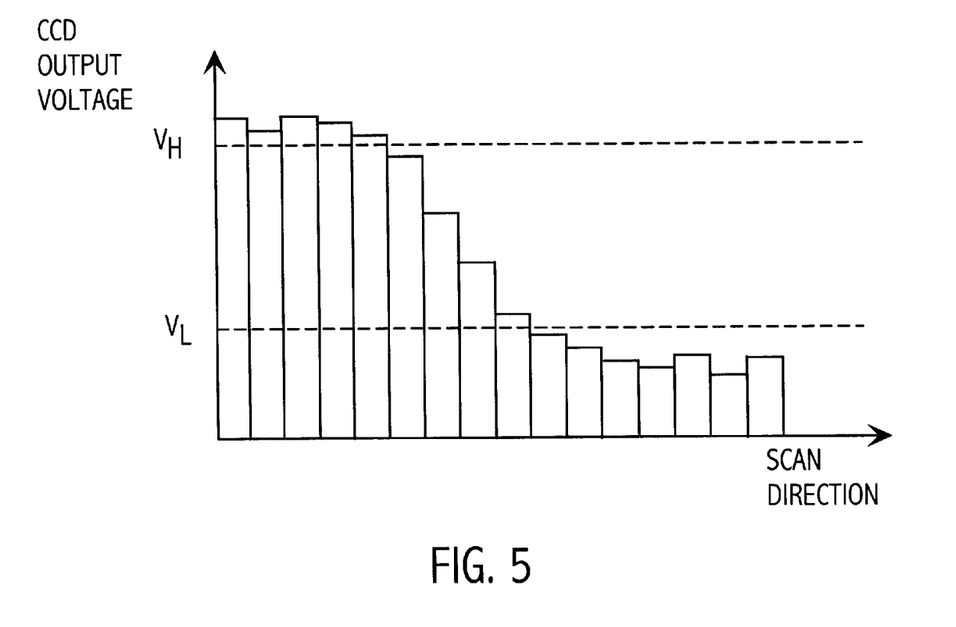
FIG. 5 is a graph showing an example of the pixel output from the CCD image sensor of FIG. 3.

To focus the portion of the image referenced by the visual pointer, the auto-focusing device 18 moves the projection lens 26 along its optical axis until the contrast in the selected portion of the image is at its greatest. The greatest contrast is indicated when the differences between the pixel intensities representing the edge are at their greatest FIG. 5 shows a graph representing exemplary output of the CCD pixels when contrast sufficient enough to perform a focusing operation is detected. Each bar in the graph represents the light intensity detected by a single pixel element in a horizontal row of the CCD array. A predetermined number of pixels are sampled corresponding to the portion selected by the visual pointer. The sequence of pixel samples are compared to a pair threshold values $V_H$ and $V_L$ determine whether a sufficient contrast transition has been detected. A sufficient degree of contrast is detected when the pixel intensity value transitions between the threshold values within a predetermined period. If sufficient contrast is not found in the first horizontal scan line, the next scan line within the selected portion of the image is tested. FIG. 3 shows four pixel element values that fall within the threshold range. To focus the portion of the image in question, the lens 26 is adjusted to minimize the number of pixel elements within this range at this particular location in the CCD array.

Figure 6:
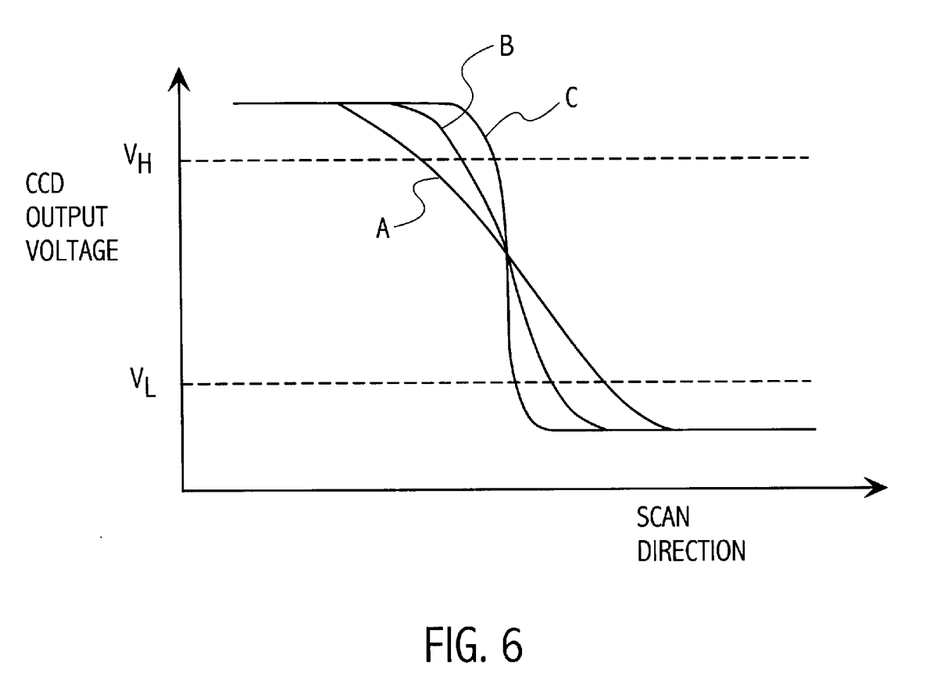
FIG. 6 is a graph showing the relationship between examples of CCD image sensor output at various focus point adjustment positions.

FIG. 6 is a graph showing an exemplary relationship between the pixel intensity values of FIG. 5 in relation to three different focus positions of the lens 26. Curve A represents a lens position that produces the least focused image. Curve B is generated when the lens is in a position closer to optimum focus. Curve C represents the CCD output when the lens is positioned for optimum focus over the portion of the image indicated by the visual pointer.

Figure 7A:
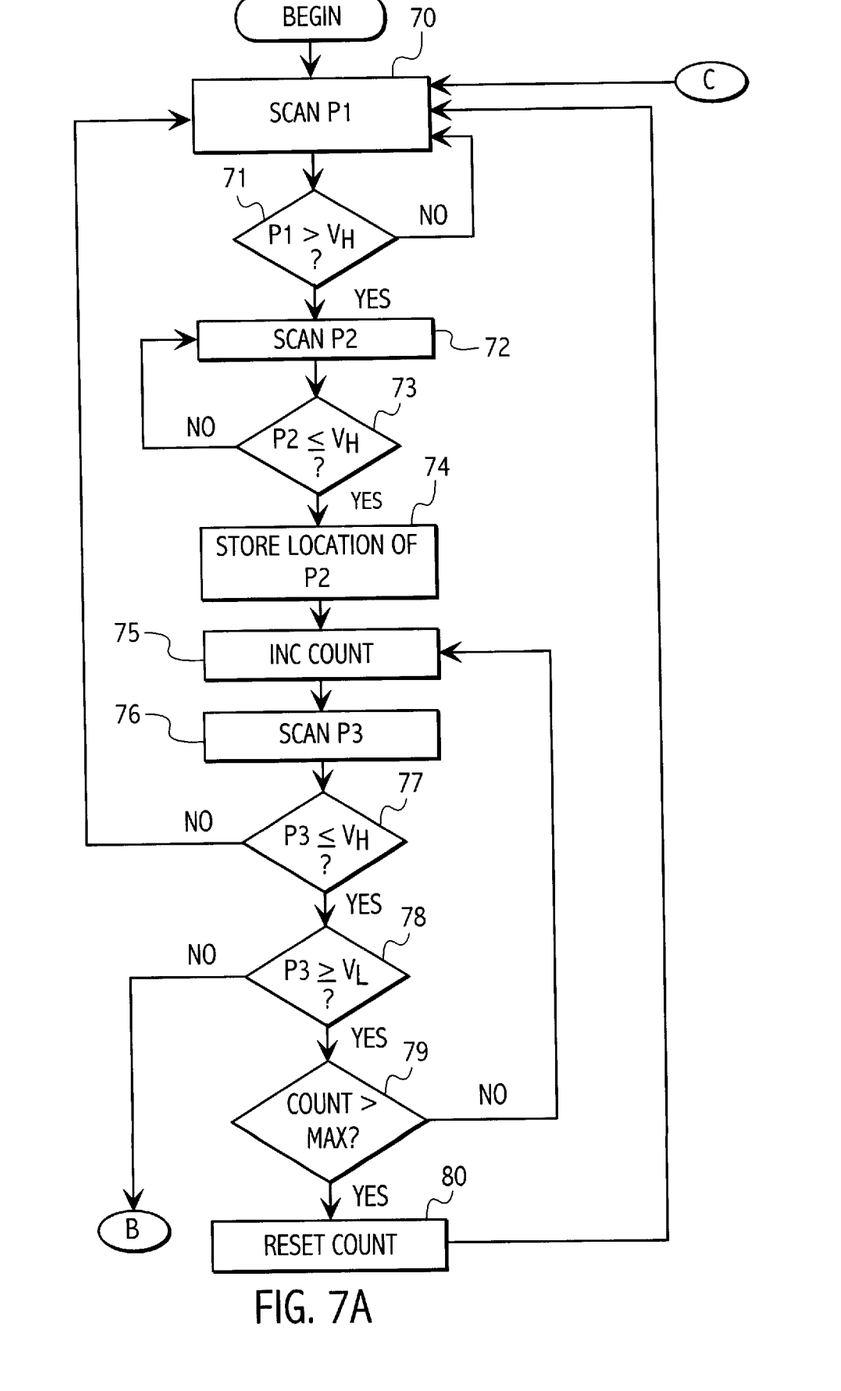
FIGS. 7a–b illustrate a flow diagram of a method of adjusting the focus of the projected image.
Figure 7B:
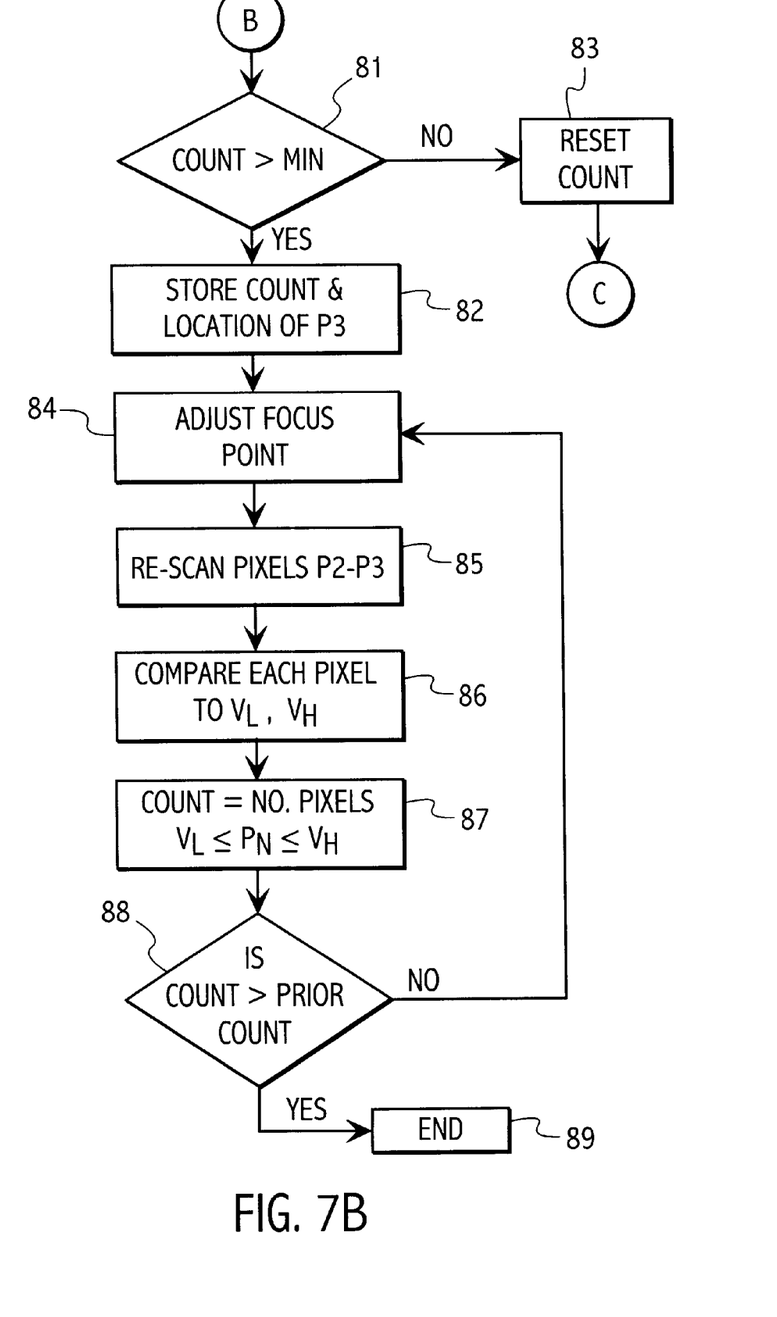

FIGS. 7*a*–*b* show a flow diagram depicting the details of an exemplary focusing algorithm that is executable by the microprocessor 48. The flow diagram presents a two part process for focusing the projection lens 26. In the first part (steps 70–81), the algorithm executes a sequence steps that find a suitable transition of pixel values between $V_H$ and $V_L$, such as that shown in FIG. 5. The pixel values can be from adjacent pixel elements of a single horizontal scan line. In the second part of the process (steps 82–88), the algorithm adjusts the position of the projection lens 26 to minimize the number of pixel values between $V_H$ and $V_L$, whereby producing a focused portion of the image.

In step 70, a pixel value P1 in the vicinity of the visual pointer is scanned from the CCD sensor 44. The value is then compared to the threshold value $V_H$ (step 71). If the value is less than $V_H$, the next pixel value is read (step 70). These steps ensure that the sampled transition starts above $V_H$ and they are repeated until a pixel value greater than $V_H$ is found.

Next, in steps 72–73, the pixel scanning continues until a pixel value P2 is found that is less than or equal to $V_H$. In step 74, the X-Y coordinate of P2 is stored. The X-Y coordinate is determined by vertical and horizontal counters similar to those used by the tracking algorithm.

In step 75, a resettable pixel counter is incremented. The pixel counter keeps track of the number of pixels having values between $V_H$ and $V_L$. In step 76, the next pixel value P3 is scanned. The pixel value P3 is then compared to determine whether it falls within the range $V_H$–$V_L$ (steps 77–78). If P3 is in range, the pixel count is checked to determine whether it has exceeded a predetermined maximum value (step 79). Placing an upper limit on the pixel count prevents the detection of transitions that do not represent image edges. If the maximum count is exceeded, the pixel counter is reset (step 80) and the procedure returns to step 70.

If P3 is greater than $V_H$ (step 77), this indicates that the transition is incomplete. In this case, the pixel counter is reset and the procedure returns to step 70. A complete transition is indicated when P3 falls below $V_L$ (step 78); when this occurs the procedure continues to step 81.

In step 81, a check is made to determine whether the pixel count is greater than a predetermined minimum value. This check eliminates any transitions that are too sharp to allow the lens to be focused. If the pixel count is not greater than the lower limit, the pixel counter is reset (step 83) and the procedure returns to step 70. Otherwise, the pixel count and X-Y location of P3 are stored (step 82).

In step 84, the focus point is adjusted by moving the projection lens 26 along its optical axis. Then, in step 85, the pixels located between P2–P3 are re-scanned. Each of the re-scanned pixels is then compared to determine whether it is within the range $V_H$ to $V_L$ (step 86). In step 87, the number of pixels within the range are counted. Next, in decision step 88, a check is made to determine whether the current count is greater than the count determined by the immediately prior iteration of steps 84–88. If the current count is greater, this indicates that the lens 26 is moving out of focus. In response to this, the lens 26 is moved to the focus position set by the immediately prior iteration of steps 84–88 and the procedure terminates. Otherwise, the procedure returns to step 84.

Referring back to FIG. 3, the auto-focusing device 18 includes an auto-focus drive 54, an electric motor 56, and a drive mechanism 58. The auto-focus drive circuit 54 generates a drive signal which activates the electric motor 56. The drive signal is generated in response to a signal generated by the microprocessor 48. The electric motor 56 can be a stepper motor. The motor 56 moves the projector lens 26 along its optical axis through the drive mechanism 58.

Figure 8:
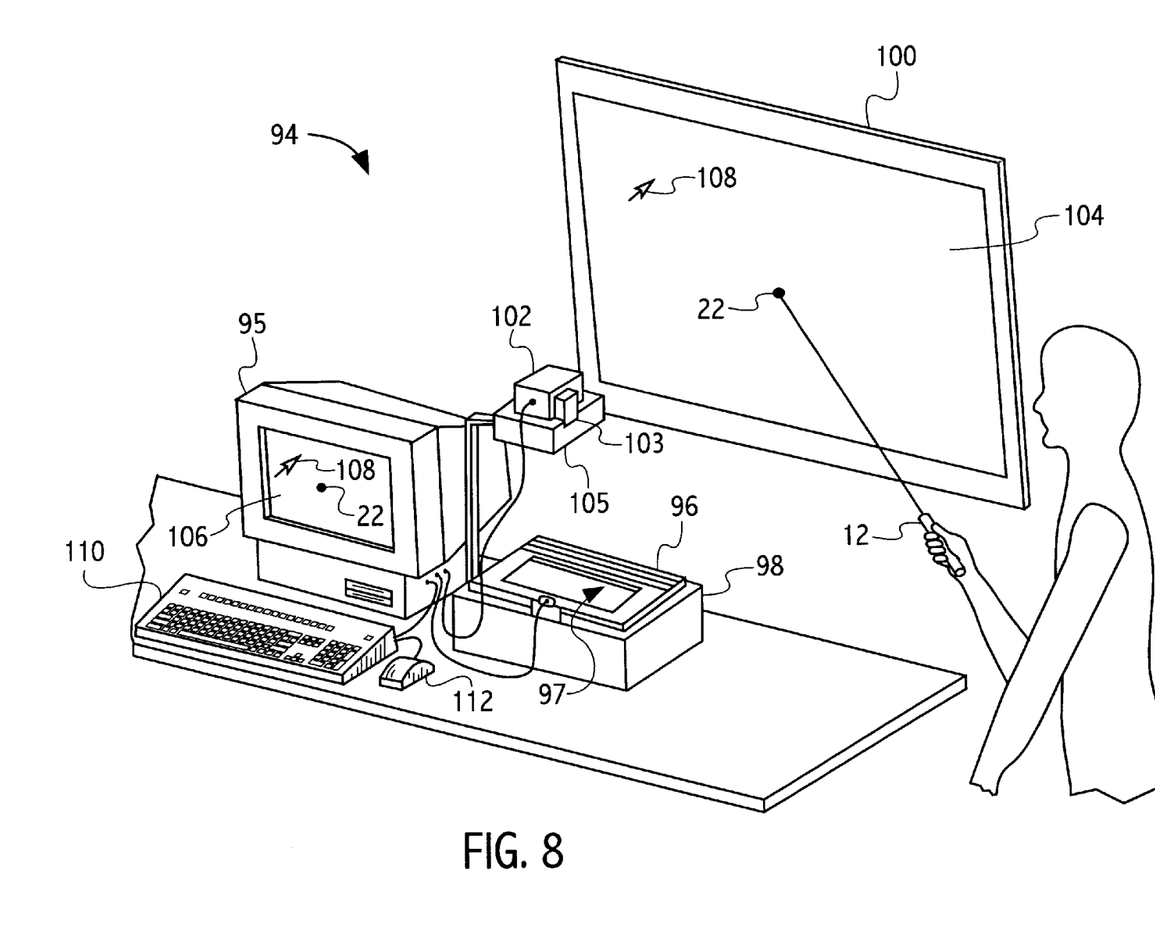
FIG. 8 depicts a computer-based display system incorporating an embodiment of the present invention.

FIG. 8 illustrates a display system that can incorporate an embodiment of the present invention. The display system 94 permits a user to highlight or point at various sections of the displayed image using either the computer keyboard, the mouse 112, or a light-generating device 12.

The system 94 includes an image source, such as a personal computer 95, and a liquid crystal display (LCD) unit 96 for displaying a computer image 97 that is projected by the overhead projector 98 onto the screen 100. The system also includes a detector 102 and auto-focus device 103 that can include the functions described for the detector 16 and auto focus device 18 of FIG. 1. The detector 102 generates a position signal indicative of the location of the visual pointer 22 on the displayed image 104. The auto-focus device 103 positions the projector lens (not shown) contained in a housing 105 based on the position signal.

In addition to providing a signal to the auto-focus device 103, the detector 102 provides information to the computer 95 that allows the computer 95 to display the visual pointer 22 on its display 106. This information can be transmitted across the communications bus 59 by connecting the bus 59 to a commonly available port included with the computer 95, such as an RS-232 port. A software routine running on the microprocessor 48 can translate the X-Y coordinates of the visual pointer into a format that is compatible with mouse positioning software included in the operating system of the computer 95. The mouse positioning software and operating system are commonly available. For example, they can be implemented using the Windows operating system from Microsoft Corporation, which can include an application programming interface (API) responsive to mouse inputs.

The computer 95 can execute an application software program, such as Power Point from Microsoft Corporation, for generating overhead presentations. The application program is typically responsive to inputs from the keyboard 110 or the mouse 112, and it can cause a cursor 108 to be displayed on the screen 100 by transmitting signals to the LCD 96.

A software module, such as an API in Windows, can interface the presentation software to the X-Y position information from the detector 102. The X-Y position information indicates the location of the visual pointer 22 on the projection screen 100. Using the interfacing software module can permit the visual pointer 22 to appear as pointer on the computer display 106.

The detector 102 can also focus a portion of the image 104 referenced by the cursor 108. This is accomplished by transmitting the cursor position to the detector 102 using the communications bus 59. The cursor position can be generated and transferred using one or more APIs included in the computer operating system. The microprocessor 48 can execute a software routine that selects either the cursor position received from the computer 95 or the visual pointer position generated by the tracking algorithm as input to the focusing algorithm. The selection can be based on a user input provided by switch that is electrically coupled to the microprocessor 48 (not shown).

Figure 9:
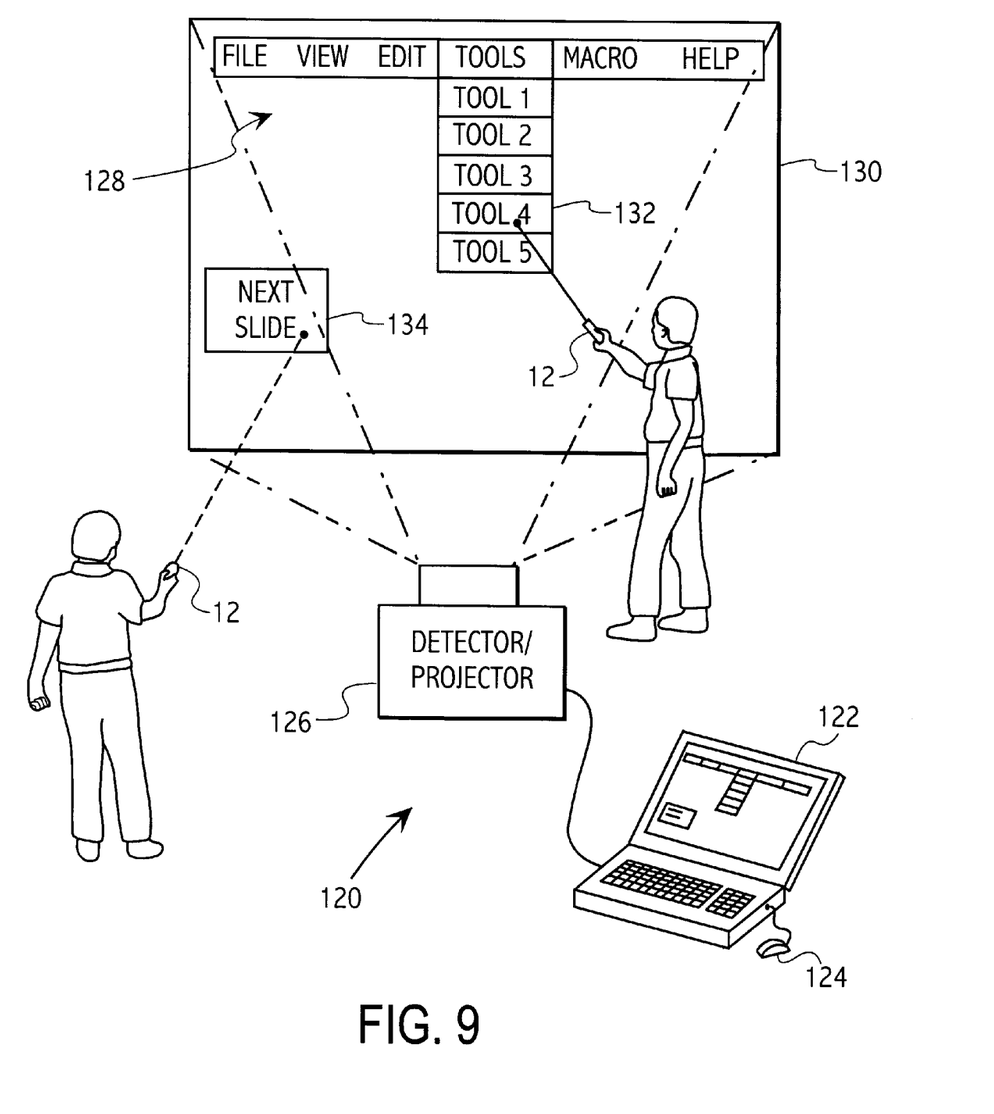
FIG. 9 depicts a computer-based display system that incorporates an embodiment of the present invention which permits viewers to remotely auto-focus the image as well as enter other control inputs.

Referring now to FIG. 9, there is illustrated an alternative display system 120 that includes a portable personal computer 122, having a mouse 124 and a detector/projector 126. The detector/projector 126 can include the functions of the projection arrangement shown in FIG. 6. In this example, one or more software control buttons 128 are projected onto a screen 130 by a presentation software program, such as Power Point. Such buttons are a popular way of selecting various operations and options to be performed by a computer program.

To actuate a software button at a conventional computer display, a user places a cursor over the button and selects an enter key on a computer keyboard. Alternatively, a mouse device may be used to position a cursor onto the desired button, which is then activated by clicking a button attached to the mouse. The computer stores the location of the cursor on the display to translate the coordinate data of the cursor into an appropriate function call. This type of selection process can be emulated using the light-generating device 12.

FIG. 9 illustrates an example of users using light-generating devices 12 to operate software buttons 132 and 134 displayed on the screen 130. In addition to generating position data, the detector 102 can generate a signal that emulates a mouse click in response to predetermined variation in the light intensity of the visual pointer. This allows the visual pointer data from the detector 102 to activate software buttons included in the presentation software. To accomplish this, the user points the light-generating device 12 to project a visual pointer onto the button 132. The detector/projector 126 generates the coordinate data for the visual pointer. While the user points at the button 132, he activates a momentary push-button switch (not shown) on the light device 12 to create a light pulse. The push-button switch toggles the light beam on and off for a brief, predetermined time period.

The projector/detector 126 can include the detector 16. To detect the emulated mouse click, the microprocessor 48 executes a software routine that receives the X-Y position of the visual pointer from the tracking algorithm. When the visual pointer is turned off, the software routine starts a time-out routine. If the visual pointer reappears in approximately the same location before the time-out period expires, the routine generates a signal that indicates that a mouse click has occurred. The microprocessor 48 then transmits a click signal, compatible with at least one known mouse interface, to the computer 122 via the communications bus 59.

Allowing a visual pointer to emulate a mouse click is advantageous during an electronic slide show. It allows a remote viewer to control presentation of the slides and to execute various computer functions by simply pointing his light-generating device on the screen.

Figure 10:
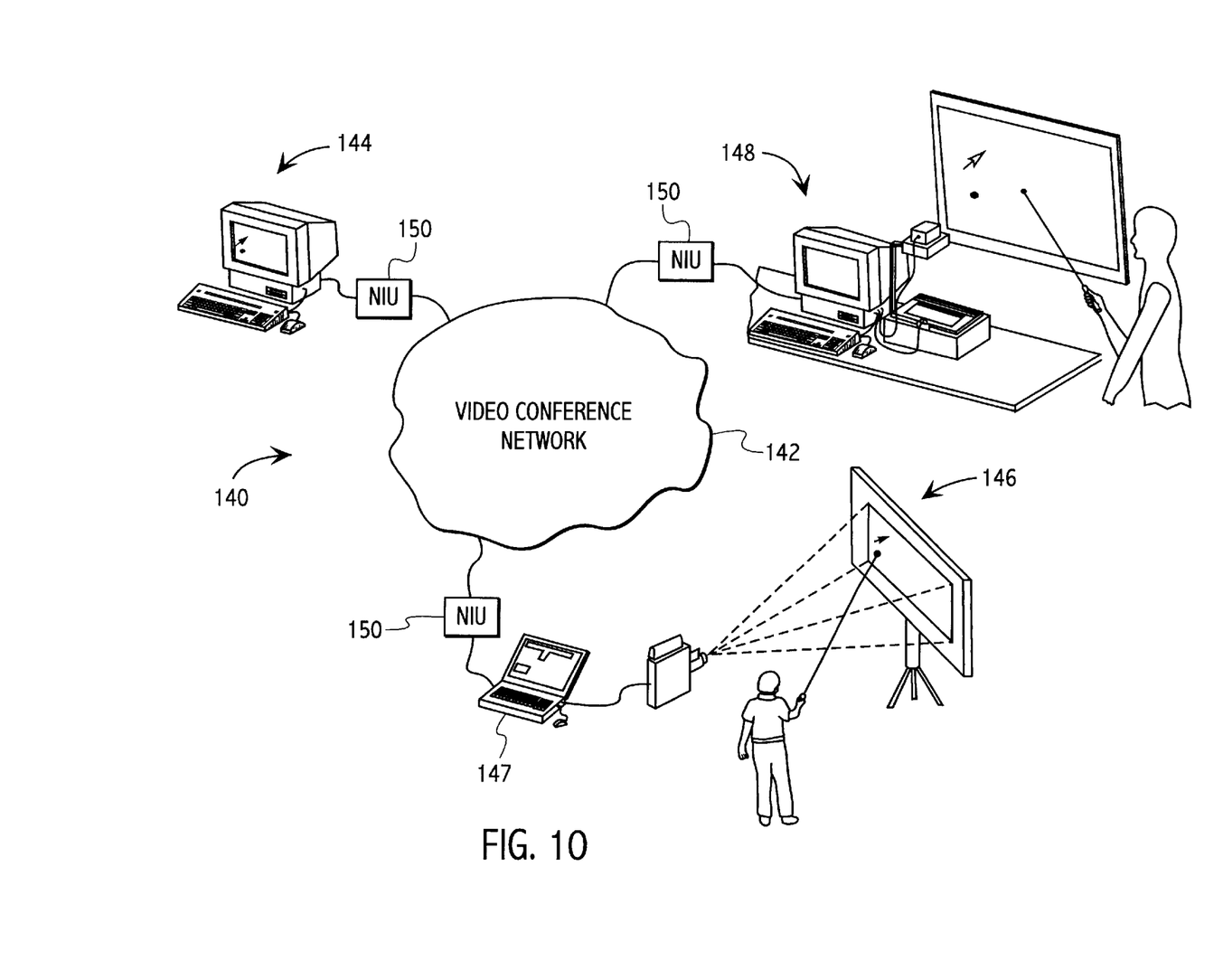
FIG. 10 illustrates a video conferencing system that includes an embodiment of the present invention.

FIG. 10 illustrates a video conferencing system 140 that can incorporate an embodiment of the present invention. The video conferencing system 140 includes a video conferencing network 142, such as an ISDN network. This communications network links a plurality of remote sites 144–146 to a presentation site 148. Each site is linked to the video conference network 42 through a network interface unit (NIU) 150. The NIU 150 implements standard network protocols that allow display systems to communicate with another over the video conference network 142. For example, the NIU 150 can be a gateway that allows a TCP/IP protocol to communicate with an ISDN network.

In addition to allowing viewers at the presentation 148 site to focus portions of projected images, the video conference system 140 permits the focused image and the visual pointer at the presentation site 148 to be displayed at other locations. This is accomplished by capturing the focused image, including the visual pointer, using conventional video conferencing software. The conferencing software then transmits the image and pointer over the network 142, along with the voice and other data normally associated with video conferencing.

While specific embodiments of the present invention have been shown and described, it will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. An apparatus for displaying a slide image, comprising:
    means for tracking a visual pointer appearing on a screen, the visual pointer being positioned by a viewer to reference a portion of a slide image, the tracking means generating a position signal representative of the visual pointer location; and
    means for projecting the slide image onto the screen, the projecting means including an auto-focus means for focusing the slide image as a function of the position signal.

2. An apparatus for controlling the focus point of an image projected onto a surface, comprising:
    a detector configured to respond to a visual pointer appearing on a surface, the visual pointer being positioned by a viewer to reference a portion of the image, the detector generating a position signal representative of the visual pointer location; and
    an auto-focus device configured to focus the portion of the image referenced by the visual pointer as a function of the position signal.

3. The apparatus of claim 2, further comprising:
    a variable focus lens operatively coupled to the auto-focus device.

4. The apparatus of claim 2, wherein the surface includes a projection screen.

5. The apparatus of claim 2, wherein the visual pointer is produced by a light pen.

6. The apparatus of claim 2, wherein the visual pointer is produced by a laser pointer.

7. The apparatus of claim 2, wherein the visual pointer is produced by a computer cursor.

8. An apparatus for displaying an image at a remote location, comprising:
    a projector for projecting an image onto a surface;
    a detector configured to respond to a visual pointer appearing on the surface, the visual pointer referencing a portion of the image, the detector generating a position signal representative of the location of the visual pointer;
    an auto-focus device configured to focus the portion of the image referenced by the visual pointer as a function of the position signal; and
    a video conferencing system for displaying the image at the remote location.

9. The apparatus of claim 8, further comprising:
    means permitting a user at the remote location to generate the visual pointer.

10. The apparatus of claim 8, further comprising:
    a computer display and a mouse permitting a user at the remote location to generate the visual pointer.

11. The apparatus of claim 8, further comprising:
    a computer for generating the image according to an interactive computer program.

12. The apparatus of claim 11, wherein the visual pointer provides a control input to the computer.

13. The apparatus of claim 8, wherein the visual pointer is generated by a light pen.

14. The apparatus of claim 13 wherein the light pen generates a pulsed beam to indicate a mouse click.

15. The apparatus of claim 8, wherein the visual pointer is generated by a laser pointer.

16. The apparatus of claim 13, wherein the light pen varies the width of a beam to indicate a mouse click.

17. A method for focusing an image, comprising the steps of:
    projecting an image onto a screen using a projector;
    projecting a visual pointer onto the screen to reference a portion of the image;
    generating a position signal representative of the location of the visual pointer on the screen; and
    auto-focusing the image based on the position signal.

18. The method of claim 17, further comprising the step of:
    producing the visual pointer with a light pen.

19. The method of claim 17, further comprising the step of:
    producing the visual pointer with a laser pointer.

20. A method for focusing an image, comprising the steps of:
    projecting an image onto a screen using a projector;
    projecting a visual pointer onto the screen to reference a portion of the image;
    generating a position signal representative of the location of the visual pointer on the screen;
    focusing the image based on the position signal; and
    receiving the visual pointer from a remote location via a communications network.

21. The method of claim 20, for use in displaying a computer-based slide show, further comprising the steps of:
    generating the image using interactive computer software; and
    executing the interactive computer software based on the position signal.

* * * * *